United States Patent
Mallick et al.

(10) Patent No.: US 10,338,828 B1
(45) Date of Patent: Jul. 2, 2019

(54) SHARED STORAGE BASED HOST DEVICE STATE TRANSITION CONTROL

(71) Applicant: EMC IP Holding Company LLC, Hopkinton, MA (US)

(72) Inventors: Sanjib Mallick, Bangalore (IN); Vinay Rao G, Bangalore (IN); Amit Pundalik Anchi, Bangalore (IN); Srinivas Kangyampeta, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 225 days.

(21) Appl. No.: 15/499,281

(22) Filed: Apr. 27, 2017

(51) Int. Cl.
*G06F 3/06* (2006.01)

(52) U.S. Cl.
CPC ............ *G06F 3/0619* (2013.01); *G06F 3/065* (2013.01); *G06F 3/067* (2013.01); *G06F 3/0634* (2013.01); *G06F 3/0665* (2013.01); *G06F 3/0625* (2013.01)

(58) Field of Classification Search
CPC .... G06F 3/0619; G06F 3/0625; G06F 3/0634; G06F 3/065; G06F 3/0665; G06F 3/067
See application file for complete search history.

(56) References Cited

U.S. PATENT DOCUMENTS

| | | | | |
|---|---|---|---|---|
| 7,634,496 | B1 * | 12/2009 | Evans | G06F 3/0605 |
| 2017/0285982 | A1 * | 10/2017 | DeArment | G06F 3/0619 |

OTHER PUBLICATIONS technet.microsoft.com, "Configure and Manage the Quorum in a Windows Server 2012 Failover Cluster," https://technet.microsoft.com/en-us/library/jj612870(v=ws.11).aspx, Mar. 8, 2016, 14 pages.
Wikipedia, "Scratchpad Memory," https://en.wikipedia.org/wiki/Scratchpad_memory, Jul. 14, 2016, 4 pages.
Wikipedia, "SCSI Command," https://en.wikipedia.org/wiki/SCSI_command, Mar. 25, 2017, 8 pages.

* cited by examiner

*Primary Examiner* — Aracelis Ruiz
(74) *Attorney, Agent, or Firm* — Ryan, Mason & Lewis, LLP

(57) ABSTRACT

An apparatus in one embodiment comprises a storage system having a plurality of storage devices. The storage system is configured for accessibility by a plurality of host devices over at least one network. The storage system is further configured to store a plurality of objects and to store host device state transition information for a plurality of data services each involving one or more of the objects. The storage system comprises first and additional sets of storage elements configured to store the host device state transition information for each of at least a subset of the objects. The first and additional sets of storage elements for a given one of the objects comprise a first set of storage elements for a first data service involving the given object, and one or more additional sets of storage elements for respective ones of one or more additional data services involving the given object.

21 Claims, 6 Drawing Sheets

US 10,338,828 B1

SHARED STORAGE BASED HOST DEVICE STATE TRANSITION CONTROL

FIELD

The field relates generally to information processing systems, and more particularly to storage in information processing systems.

BACKGROUND

A wide variety of different types of storage systems are known. For example, some storage systems are configured to include multiple storage tiers, with different ones of the tiers providing different levels of input-output (IO) performance or other characteristics. In such storage systems, data may be moved from one tier to another within a given storage system based on access frequency of the data or other factors. These and other types of storage systems may be shared by multiple host devices of a compute cluster. However, problems can arise in such arrangements in that it can be unduly difficult to coordinate state transitions of multiple host devices in implementing data services involving the storage system.

SUMMARY

In one embodiment, an apparatus comprises a storage system having a plurality of storage devices. The storage system is configured for accessibility by a plurality of host devices over at least one network. The storage system is further configured to store a plurality of objects and to store host device state transition information for a plurality of data services each involving one or more of the objects. The storage system comprises first and additional sets of storage elements configured to store the host device state transition information for each of at least a subset of the objects. The first and additional sets of storage elements for a given one of the objects comprise a first set of storage elements configured to store current state information for each of the host devices for a first data service involving the given object, and one or more additional sets of storage elements configured to store current state information for each of the host devices for respective ones of one or more additional data services involving the given object. The first and additional sets of storage elements configured to store host device state transition information are illustratively utilized by state control elements of respective ones of the host devices to ensure atomicity in state transitions of the host devices for the corresponding first and additional data services.

Other illustrative embodiments include, without limitation, apparatus, systems, methods and computer program products comprising processor-readable storage media.

DETAILED DESCRIPTION

Illustrative embodiments of the present disclosure will be described herein with reference to exemplary information processing systems and associated computers, servers, storage devices and other processing devices. It is to be appreciated, however, that embodiments of the disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. In many embodiments, an information processing system may therefore comprise, for example, at least one data center that includes one or more clouds hosting multiple tenants that share cloud resources. Numerous other types of enterprise and cloud-based computing and storage systems are also encompassed by the term "information processing system" as that term is broadly used herein.

Figure 1:
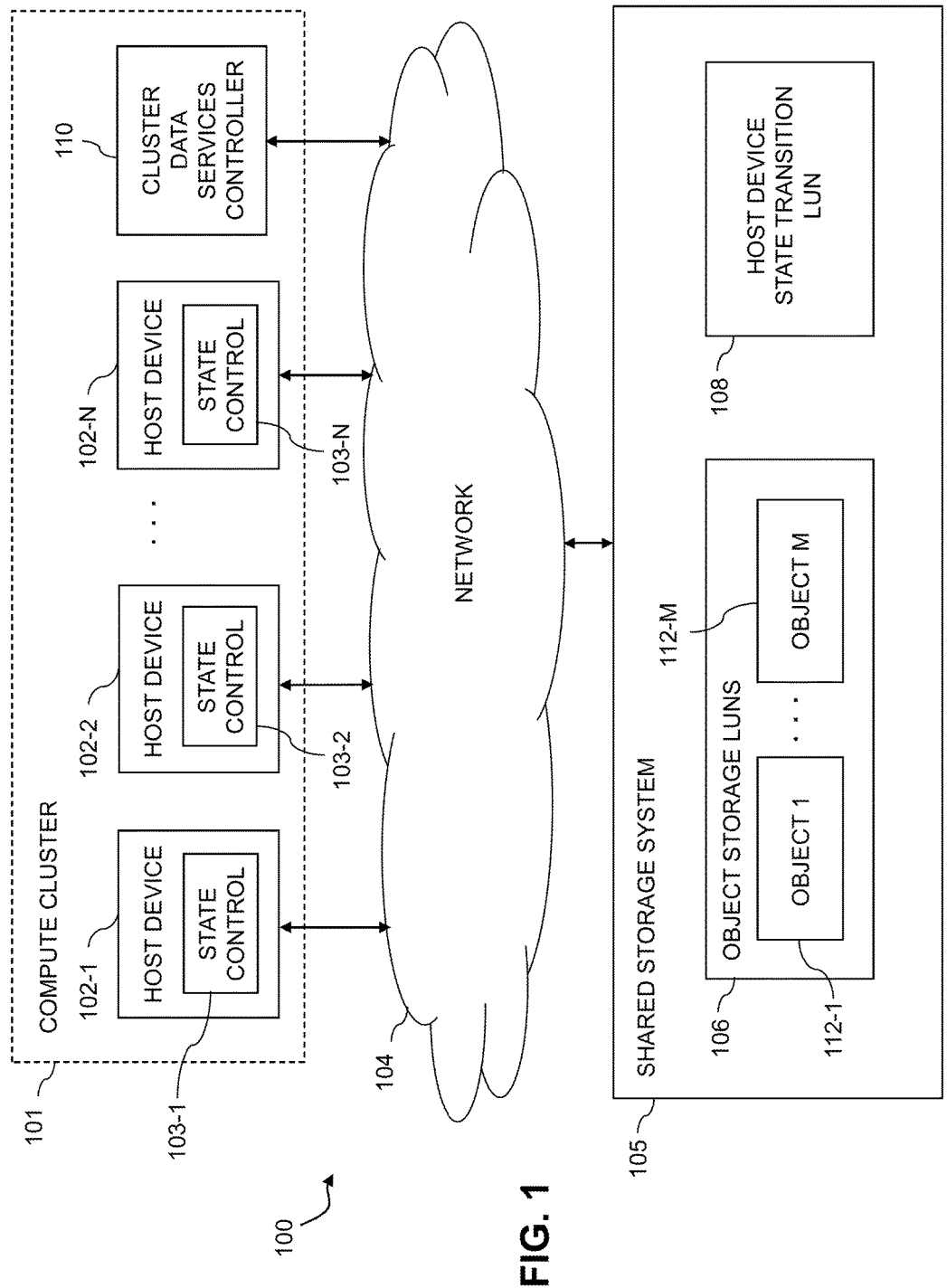
FIG. 1 is a block diagram of an information processing system implementing shared storage based host device state transition control in an illustrative embodiment.

The example embodiment of FIG. 1 shows an information processing system 100 configured in accordance with an illustrative embodiment of the present disclosure. The information processing system 100 comprises a compute cluster 101 that includes host devices 102-1, 102-2, . . . 102-N having respective state control elements 103-1, 103-2, . . . 103-N. The host devices 102 communicate over a network 104 with a shared storage system 105.

The host devices 102 illustratively comprise respective computers or other types of processing devices capable of communicating with the shared storage system 105 over the network 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102. The term "user" herein is intended to be broadly construed so as to encompass numerous arrangements of human, hardware, software or firmware entities, as well as combinations of such entities. Compute services may be provided for users under a platform-as-a-service (PaaS) model, although it is to be appreciated that numerous other cloud infrastructure arrangements could be used.

The shared storage system 105 is accessible to the host devices 102 of the compute cluster 101 over the network 104. The shared storage system 105 comprises a plurality of storage devices implementing logical units (LUNs) including object storage LUNs 106 and a host device state transition LUN 108.

The compute cluster 101 in the present embodiment includes a cluster data services controller 110. The data services controller 110 coordinates data services for the host devices 102 such as migration services and replication services involving the object storage LUNs 106 of the shared storage system 105. It is to be appreciated that migration services and replication services are only examples of data services, and that numerous other types of data services may be implemented in other embodiments.

The data services are associated with respective distributed state machines each comprising a plurality of host device states and host device state transitions. The host device state transitions of a given one of the distributed state machines are controlled by state control elements 103 of respective ones of the host devices 102 in accordance with state transition rules of that distributed state machine. A more detailed example of one possible configuration of a distributed state machine will be described below in conjunction with the illustrative embodiment of FIG. 3.

The shared storage system 105 is configured to store a plurality of objects 112-1, ... 112-M in the object storage LUNs 106. The shared storage system 105 is further configured to store host device state transition information in the host device state transition LUN 108 for a plurality of data services implemented under the control of the data services controller 110, each involving one or more of the objects 112. The objects 112 may each comprise one or more files, blocks or other types of objects.

A given one of the objects 112 comprises at least a portion of at least one of the object storage LUNs 106. For example, each of the LUNs 106 may correspond to a separate one of the objects 112. Alternatively, one or more of the LUNs 106 may comprise respective portions of one of the objects 112. It is also possible that one of the objects 112 may comprise multiple ones of the LUNs 106.

The host device state transition LUN 108 illustratively comprises first and additional sets of storage elements configured to store the host device state transition information for each of at least a subset of the objects 112. The first and additional sets of storage elements for a given one of the objects 112 more particularly comprise a first set of storage elements configured to store current state information for each of the host devices 102 for a first data service involving the given object 112, and one or more additional sets of storage elements configured to store current state information for each of the host devices 102 for respective ones of one or more additional data services involving the given object 112.

The first and additional sets of storage elements illustratively comprise respective tables storing current state information for each of the host devices 102 for respective ones of the first and additional data services involving the given object 112. A more detailed example of one possible arrangement of such tables will be described below in conjunction with the illustrative embodiment of FIG. 4.

The first and additional sets of storage elements of the LUN 108 configured to store host device state transition information are utilized by the state control elements 103 of respective ones of the host devices 102 to ensure atomicity in state transitions of the host devices 102 for the corresponding first and additional data services. The LUN 108 illustratively comprises a "scratchpad" LUN that is separate from the object storage LUNs 106 that are used to store objects within the shared storage system 105.

Portions of the host device state transition information stored in the host device state transition LUN 108 are read by the state control elements 103 of respective ones of the host devices 102 in order for those host devices to determine if a transition to another state is permissible under the state transition rules of a given one of the distributed state machine used to implement a corresponding data service in the system 100.

Writes by the host devices 102 to the first and additional sets of storage elements of the LUN 108 configured to store the host device state transition information are performed using atomic compare and write commands. For example, a given one of the atomic compare and write commands may comprise a Small Computer System Interface (SCSI) compare and write command.

The compute cluster 101 and shared storage system 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The compute cluster 101 and the shared storage system 105 may be implemented on respective distinct processing platforms, although numerous other arrangements are possible. For example, in some embodiments at least portions of the compute cluster 101 and the shared storage system 105 are implemented on the same processing platform. The shared storage system 105 can therefore be implemented at least in part within at least one processing platform that implements at least a subset of the host devices 102.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using IP or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The shared storage system 105 in some embodiments may be implemented as part of cloud infrastructure in the form of a cloud-based system such as an Amazon Web Services (AWS) system. Other examples of cloud-based systems that can be used to provide at least portions of the shared storage system 105 and possibly other portions of system 100 include Google Cloud Platform (GCP) and Microsoft Azure.

The shared storage system 105 can comprise any of a variety of different types of storage including network-attached storage (NAS), storage area networks (SANs), direct-attached storage (DAS) and distributed DAS, as well as combinations of these and other storage types, including software-defined storage.

Other particular types of storage products that can be used in implementing a given storage system in an illustrative embodiment include VNX® and Symmetrix VMAX® storage arrays, software-defined storage products such as ScaleIO™ and ViPR®, flash-based storage arrays such as DSSD™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators in the S-Series, X-Series and NL-Series product lines, all from Dell EMC. Combinations of multiple ones of these and other storage products can also be used in implementing a given storage system in an illustrative embodiment.

The term "processing platform" as used herein is intended to be broadly construed so as to encompass, by way of illustration and without limitation, multiple sets of processing devices and associated storage systems that are configured to communicate over one or more networks. For example, distributed implementations of the compute cluster 101 are possible, in which certain components of the cluster reside in one data center in a first geographic location while other components of the cluster reside in one or more other data centers in one or more other geographic locations that are potentially remote from the first geographic location. Thus, it is possible in some implementations of the system 100 for different ones of the host devices 102 to reside in different data centers than the shared storage system 105. Numerous other distributed implementations of one or both of the compute cluster 101 and the shared storage system 105 are possible. Accordingly, the shared storage system 105 can also be implemented in a distributed manner across multiple data centers.

Although illustratively shown as being implemented within the compute cluster 101 in this embodiment, the data services controller 110 in other embodiments can be implemented at least in part within the shared storage system 105, in another system component, or as a stand-alone component coupled to the network 104.

It is to be appreciated that these and other features of illustrative embodiments are presented by way of example only, and should not be construed as limiting in any way.

Accordingly, different numbers, types and arrangements of system components such as compute cluster 101, host devices 102, state control elements 103, network 104, shared storage system 105, storage LUNs 106 and 108, and data services controller 110 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of the example embodiment of FIG. 2. The process as shown includes steps 200 through 206, and is suitable for use in the system 100 but is more generally applicable to other types of systems comprising multiple host devices and a shared storage system.

In step 200, a storage system is configured for accessibility by host devices over a network.

In step 202, objects are stored in object storage LUNs of the storage system.

In step 204, host device state transition information is stored in a host device state transition LUN of the storage system.

In step 206, the stored host device state transition information is utilized to control state transitions of host devices participating in a data service.

Figure 2:
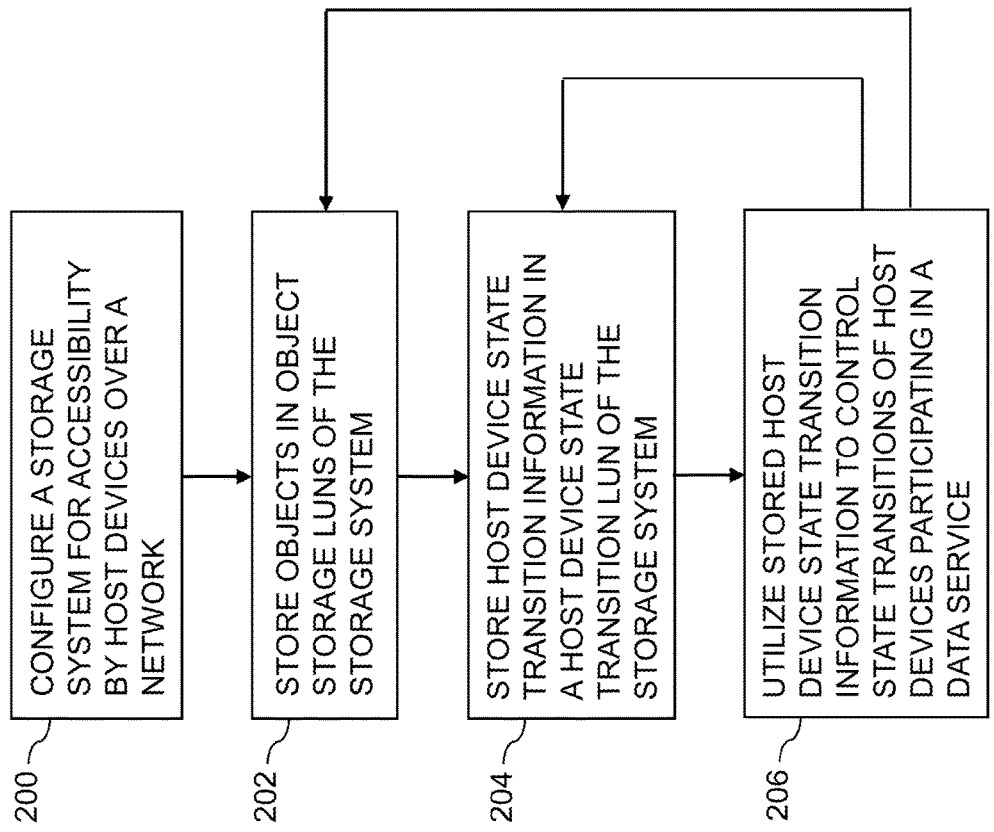
FIG. 2 is a flow diagram of a process for shared storage based host device state transition control in an illustrative embodiment.

Steps 202, 204 and 206 of the FIG. 2 process can be repeatedly iterated as needed, as indicated by the feedback arrows from step 206 to steps 202 and 204 in the figure.

In the context of the FIG. 1 embodiment, the shared storage system 105 is configured for accessibility by the host devices 102 over the network 104 in step 200, objects 112 are stored in object storage LUNs 106 in step 202, host device state transition information is stored in host device state transition LUN 108 in step 204, and the stored host device state transition information is utilized by the state control elements 103 of the host devices 102 to control state transitions of the host devices 102 participating in a data service orchestrated by the data services controller 110 in step 206.

It is to be appreciated that the FIG. 2 process can be adapted for use with other types of information systems, including by way of example an information processing system in which multiple host devices and a shared storage system are all implemented on the same processing platform.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving host devices, storage systems and distributed data services. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different distinct data services within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Figure 3:
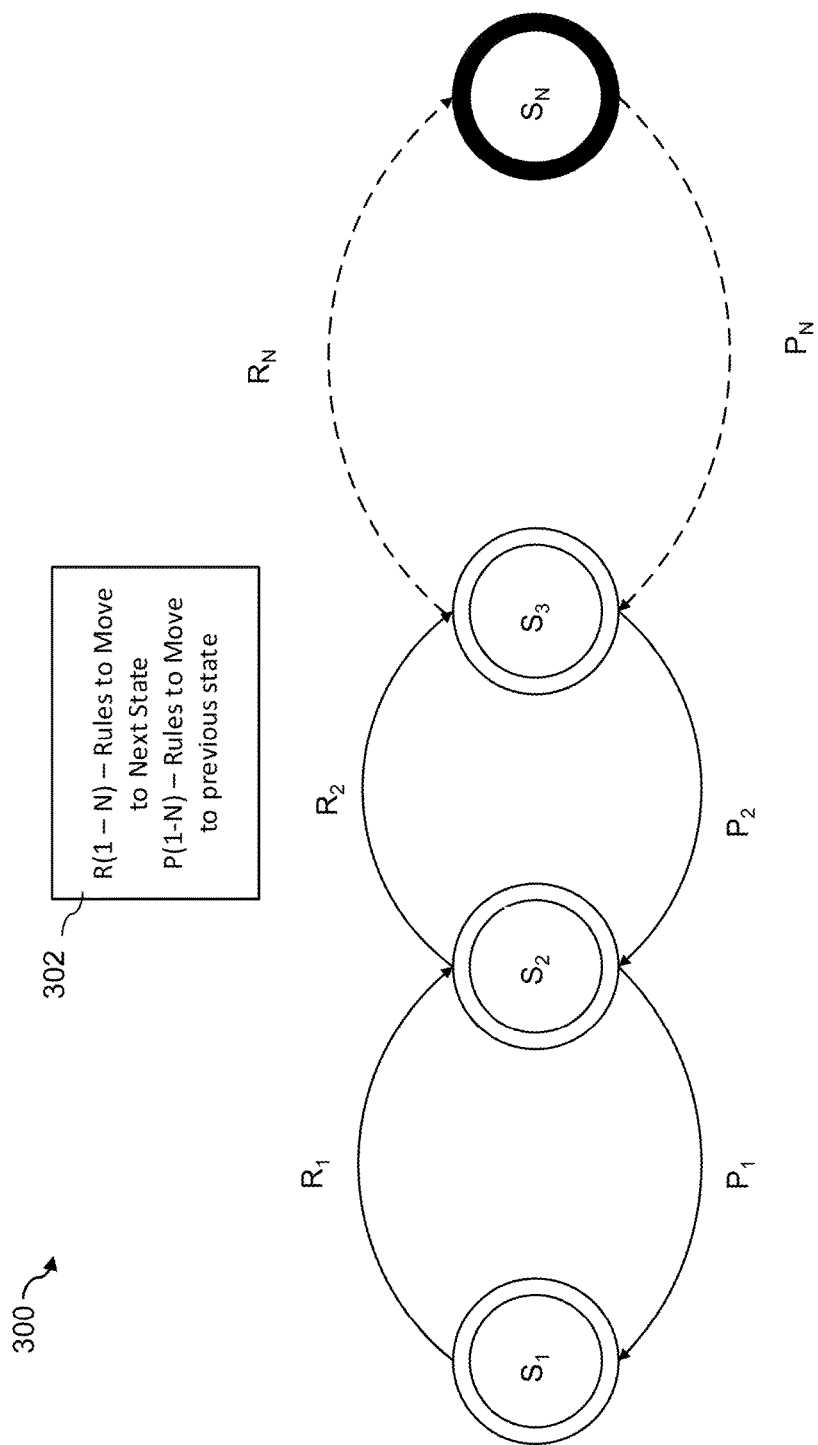
FIG. 3 shows an example of a distributed state machine implemented by multiple host devices in an illustrative embodiment.

Referring now to FIG. 3, an example of a distributed state machine 300 implemented by multiple host devices in an illustrative embodiment is shown. The distributed state machine may be implemented by the host devices 102 in the FIG. 1 embodiment in conjunction with a corresponding data service orchestrated by the data services controller 110.

The distributed state machine 300 comprises N states denoted $S_1, S_2, S_3, \ldots S_N$. The corresponding data service involves transitioning the host devices 102 between the states of the distributed state machine 300. At least a subset of state transitions are illustratively atomic within the compute cluster 101, in that the host devices 102 that are participating in the data service will generally undergo such state transitions at substantially the same time, in accordance with one or more sets of state transition rules 302. Such atomicity of the state transitions across the participating host devices 102 of the compute cluster 101 ensures that data consistency is maintained in the shared storage system 105.

It should be noted that variable N in the context of the number of states of the distributed state machine 300 is not the same as the variable N in the context of the number of host devices as used elsewhere herein.

The state transition rules 302 for the distributed state machine 300 illustratively comprise rules denoted $R_1, R_2, \ldots R_N$ for moving from respective ones of the states other than the final state $S_N$ to a next one of the states as illustrated in the figure. The state transition rules 302 for the distributed state machine 300 further comprise rules denoted $P_1, P_2, \ldots P_N$ for moving from respective ones of the states other than the first state $S_1$ to a previous one of the states as illustrated in the figure.

The distributed state machine 300 may be configured under the control of the data services controller 110 and the host device state control elements 103 to ensure that input-output (IO) operations are suspended in all of the host devices 102 in conjunction with a given one of the state transitions. The suspended IO operations are resumed after all of the host devices 102 have transitioned to the new state.

Numerous different arrangements of state transition rules may be implemented by the distributed state machine 300.

For example, the state transition rules can include a rule specifying that a given host device can advance from a particular state to a next state only if all other host devices have reached the particular state. In accordance with such a rule, a host device can at most progress one state higher only if no other host devices are lagging more than one state behind. A host device can therefore move to state $S_2$ only if all the other host devices have reached state $S_1$.

As another example, the state transition rules can include a rule specifying that a given host device can advance from a previous state to a particular state and then from the particular state to a next state only if all other host devices have reached the particular state. As a result, a host device which is in state $S_1$ can move to state $S_2$ and then directly to state $S_3$ if and only if all the other host devices are already in state $S_2$.

A further example of a state transition rule is a rule specifying that if all host devices cannot advance from a particular state to a next state within a designated period of time then all host devices must return to the particular state. Attempts to move to a higher state are therefore time bound in that if any one of the host devices cannot move to the higher state after a certain period of time, all of the other host devices would instead return to a lower stable state and then start the atomic state transition process over again. Such a state transition rule may be subject to a specified number of retries. The data services controller 110 can establish the number of retries for a specific state transition.

Other examples of state transition rules include one or more additional rules specifying one or more actions taken responsive to detection of at least one of an absent liveliness indication and a data rendering fault for at least one of the host devices 102.

In such an arrangement, each of the host devices 102 regularly registers a liveliness indication in the host device state transition LUN 108. The absence of an expected such liveliness indication signals that the corresponding host device has failed or is otherwise "dead" for purposes of the particular data service. A data service of this type may include a requirement that the remaining ones of the host devices 102 cannot consider the dead host device as a participant in the data service.

Data rendering faults can include IO errors or other types of errors in any given host device. Similar effects can result from external commands that cause the given host device to abort the data service. In these and other similar situations, one or more state transition rules can be established that specify that the entire data service be aborted for all of the host devices. Alternatively, the remaining host devices can return to a previous stable state and wait for the recovery of the given host device. Another possible approach is to allow the remaining host devices to reach the final state of the distributed state machine such that the data service is completed for those host devices. Typically an abort will cause the impacted host device to return to the first state unless the current state transition is irreversible in accordance with one or more other state transition rules.

Figure 4:
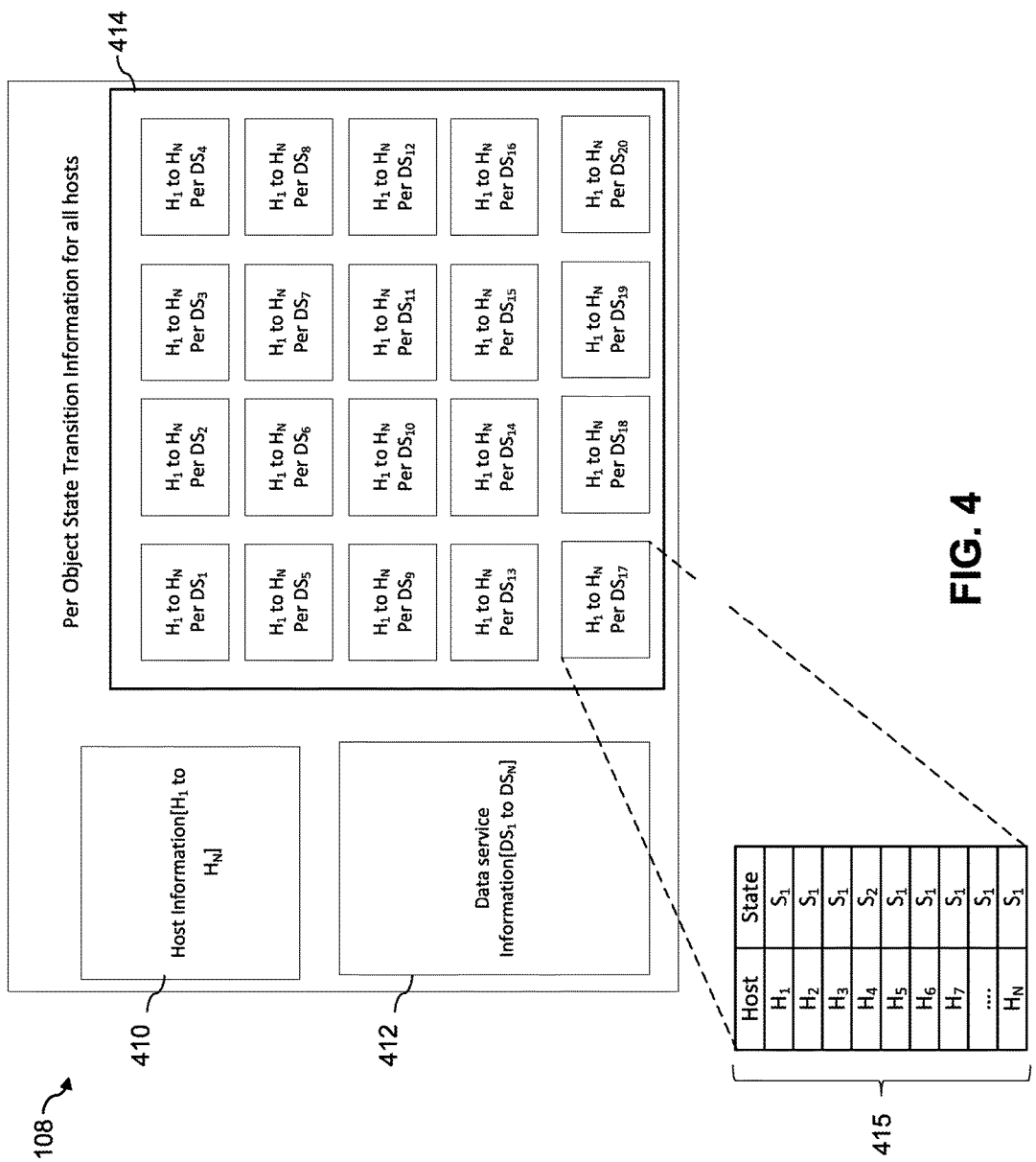
FIG. 4 shows an example of a host device state transition logical unit of a shared storage system in an illustrative embodiment.

FIG. 4 shows an example implementation of host device state transition LUN 108 of shared storage system 105 in an illustrative embodiment. The host device state transition LUN 108 comprises a host information table 410, a data service information table 412, and per-object state transition information 414.

The host information table 410 is configured to store host identification and liveliness information for respective ones of the host devices 102. The host devices 102 are also denoted herein as $H_1$ through $H_N$. The host identification information includes unique information associated with the corresponding host device, such as a media access control (MAC) identifier or a combination of a MAC identifier and other unique parameters of the host device. The host liveliness information is updated regularly by the host device and illustratively provides a "heartbeat" indicative of the current condition of the host device. The host liveliness information allows the distributed state machine to handle faults and other exception conditions. Additional information in the host information table illustratively comprises a predetermined number that is assigned when the host device is initialized and serves as a sorting key into the host information table 410.

The data service information table 412 is a look-up table into the per-object state transition information 414 for each of a plurality of data services illustratively including data services denoted as $DS_1$ through $DS_{20}$. The data service information table 412 provides efficient access into the portions of the per-object state transition information 414 that are associated with respective ones of the data services.

The tables 410 and 412 are also utilized by the data services controller 110 to implement one or more of the data services and to reconstruct host device state transition information responsive to a reboot of at least one of the host devices 102.

The per-object state transition information 414 as illustrated in the figure comprises host device transition information for each of the host devices $H_1$ through $H_N$ and for each of the data services $DS_1$ through $DS_{20}$ for a given one of the objects 112. The host device state transition LUN 108 comprises a similar arrangement for each of the other objects 112, although those additional arrangements are not shown in the figure.

The per-object state transition information 414 more particularly comprises a plurality of tables for respective ones of the data services $DS_1$ through $DS_{20}$. Each of the tables is configured in a manner similar to that shown for table 415 and indicates the current state of each of the hosts $H_1$ through $H_N$ within a distributed state machine for a corresponding one of the data services $DS_1$ through $DS_{20}$ and for a given one of the objects 112. The tables of the per-object state transition information 414 are examples of what are more generally referred to herein as respective first and additional sets of storage elements of the shared storage system 105. Each of the tables shown in per-object state transition information 414 is configured to store current state information for each of the host devices $H_1$ through $H_N$ for a different one of the data services $DS_1$ through $DS_{20}$ involving the given object 112.

The tables 410 and 412 and per-object state transition information 414 are utilized by the state control elements 103 of respective ones of the host devices $H_1$ through $H_N$ to ensure atomicity in state transitions of the host devices $H_1$ through $H_N$ for the corresponding data services $DS_1$ through $DS_{20}$.

The host device state transition LUN 108 in this embodiment is assumed to be implemented utilizing a "scratchpad" LUN, although other types of LUNs or alternative sets of storage elements may be used in other embodiments.

The host devices 102 illustratively record their respective state information in the LUN 108 utilizing an atomic Compare and Write SCSI command denoted by SCSI opcode 0x89. Other types of atomic compare and write commands can be used for writes by the host devices 102 of their respective host device state transition information to their respective portions of the LUN 108. Host device state transitions for a given one of the data services are controlled in accordance with the state transition rules of the corresponding distributed state machine implemented by the state control elements 103 of the respective host devices 102 as orchestrated by the data services controller 110. The atomic Compare and Write SCSI operation provides an efficient and operating system independent quorum service for state transitions of the host devices 102 for each of the data services. It advantageously eliminates the possibility of race conditions among the host device state transitions.

A given one of the data services orchestrated by the data services controller 110 illustratively involves a particular subset of the objects 112 and a participating subset of the host devices 102. It is assumed that each of the data services, each of the objects 112 and each of the host devices 102 has a corresponding unique identifier.

It should be understood that the particular information processing system arrangements illustrated in FIGS. 1 through 4 are presented by way of illustrative example only, and should not be construed as limiting in any way. Numerous alternative configurations of system and device elements and associated processing operations can be used in other embodiments.

In these and other embodiments, compute services can be offered to cloud infrastructure tenants or other system users as a PaaS offering, although numerous alternative arrangements are possible.

Illustrative embodiments disclosed herein can provide a number of significant advantages relative to conventional arrangements.

For example, one or more embodiments facilitate the efficient and reliable achievement of atomic state transitions among multiple host devices participating in a given data service. Such atomic state transitions are important in numerous contexts, including host-based LUN migration implemented on a cluster of host devices where migration states across host devices need to be atomic in order to avoid data corruption. These and other embodiments can allow simultaneous migration of entire data stores or other multi-LUN storage arrangements instead of migrating single LUNs.

Additionally or alternatively, one or more embodiments facilitate the synchronization of data services across multiple host devices through the use of atomic compare and write commands to write host device state information to a host device state transition LUN or other arrangement of host device state transition storage elements.

In some embodiments, the shared storage based host device state transition control is implemented in a manner that is independent of host device operating system and can therefore be implemented in a wide variety of different types of information processing systems without regard to operating system.

As another example, illustrative embodiments are readily scalable to large numbers of host devices, and to large numbers of data services comprising any desired number of states. These embodiments can therefore be used to guarantee atomic state transitions for the host devices in numerous distinct system configurations.

Some embodiments avoid problems associated with conventional cluster quorum services such as those that rely on operating system specific implementations or TCP based connections that can lead to excessive 10 timeout issues.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as host devices 102 and shared storage system 105, or portions thereof, are illustratively implemented for use by tenants of such a multi-tenant environment.

As mentioned previously, cloud infrastructure as disclosed herein can include cloud-based systems such as AWS, GCP and Microsoft Azure. Virtual machines provided in such systems can be used to implement at least portions of one or more of a compute cluster and a shared storage system in illustrative embodiments. These and other cloud-based systems in illustrative embodiments can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. Although described in the context of system 100, these platforms may also be used to implement at least portions of other information processing systems in other embodiments.

Figure 5:
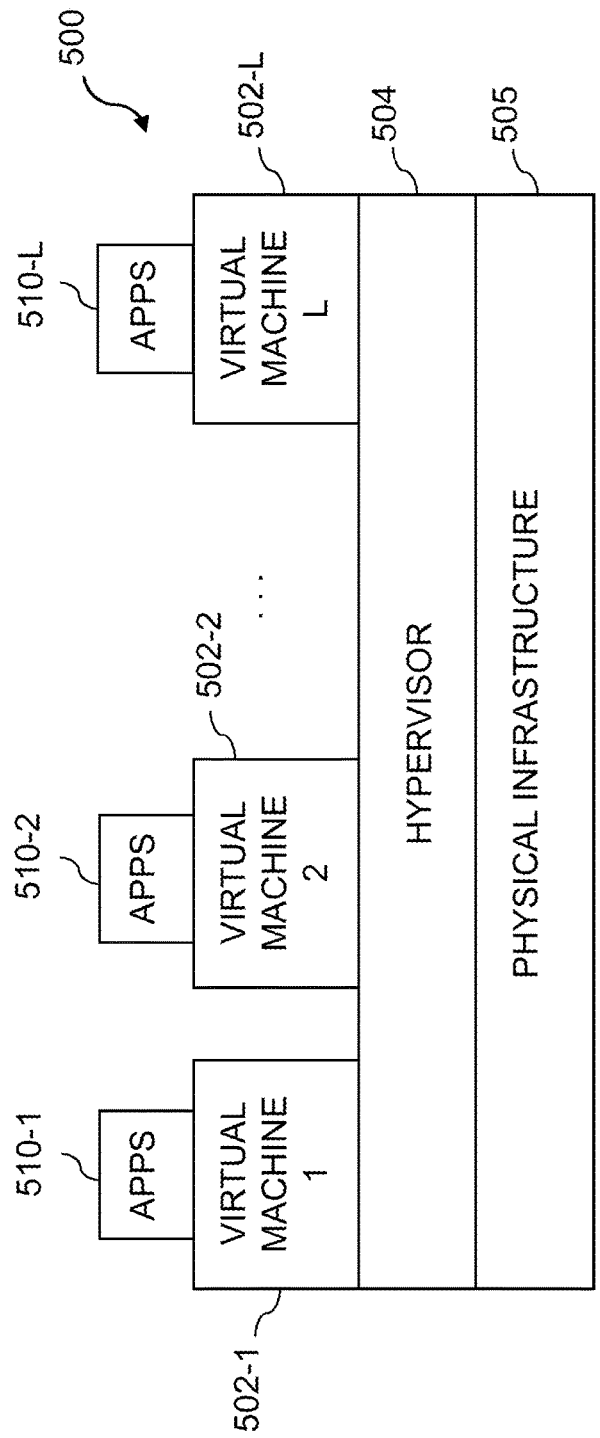
FIGS. 5 and 6 show examples of processing platforms that may be utilized to implement at least a portion of an information processing system in illustrative embodiments.
Figure 6:
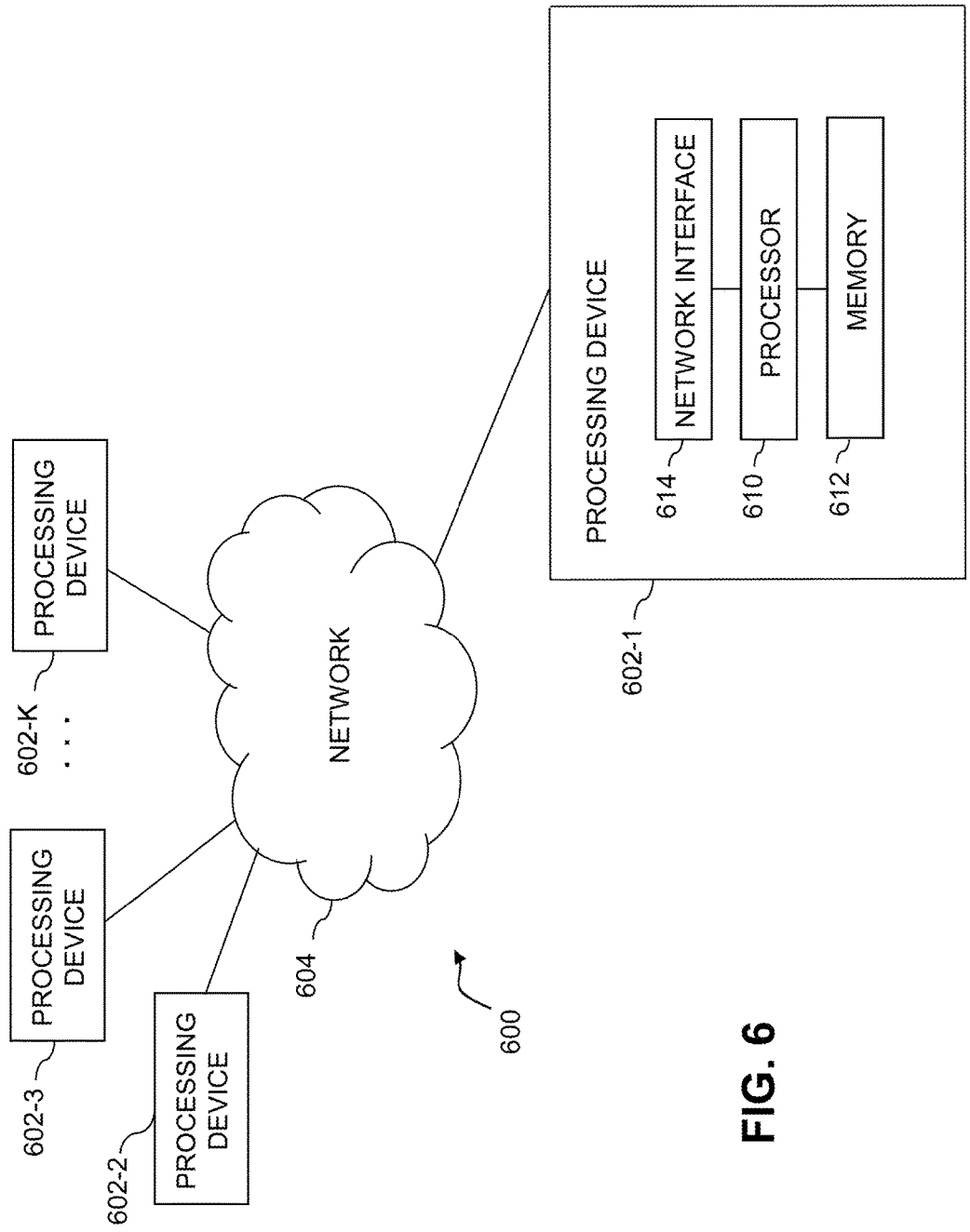

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises virtual machines (VMs) 502-1, 502-2, . . . 502-L implemented using a hypervisor 504. The hypervisor 504 runs on physical infrastructure 505. The cloud infrastructure 500 further comprises sets of applications 510-1, 510-2, . . . 510-L running on respective ones of the virtual machines 502-1, 502-2, . . . 502-L under the control of the hypervisor 504.

Although only a single hypervisor 504 is shown in the embodiment of FIG. 5, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a commercially available hypervisor platform that may be used to implement hypervisor 504 and possibly other portions of the information processing system 100 in one or more embodiments is the VMware® vSphere® which may have an associated virtual infrastructure management system such as the VMware® vCenter™. The underlying physical machines may comprise one or more distributed processing platforms that include one or more storage systems.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA) or other type of processing circuitry, as well as portions or combinations of such circuitry elements.

The memory 612 may comprise random access memory (RAM), read-only memory (ROM) or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of one or more components of the host devices 102 and the shared storage system 105 are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, compute clusters, host devices, data services controllers and storage systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
a storage system comprising a plurality of storage devices;
the storage system being configured for accessibility by a plurality of host devices over at least one network;
the storage system being configured to store a plurality of objects;
the storage system being further configured to store host device state transition information for a plurality of data services each involving one or more of the objects;
the storage system comprising first and additional sets of storage elements configured to store the host device state transition information for each of at least a subset of the objects, the first and additional sets of storage elements for a given one of the objects comprising:
a first set of storage elements configured to store current state information for each of the host devices for a first data service involving the given object; and
one or more additional sets of storage elements configured to store current state information for each of the host devices for respective ones of one or more additional data services involving the given object.

2. The apparatus of claim 1 wherein the storage system is implemented at least in part within at least one processing platform that implements at least a subset of the host devices.

3. The apparatus of claim 1 wherein the first and additional sets of storage elements comprise respective tables storing current state information for each of the host devices for respective ones of the first and additional data services involving the given object.

4. The apparatus of claim 1 wherein the first and additional sets of storage elements configured to store host device state transition information are utilized by state control elements of respective ones of the host devices to ensure atomicity in state transitions of the host devices for the first and additional data services.

5. The apparatus of claim 1 wherein the data services comprise at least one of a migration service and a replication service.

6. The apparatus of claim 1 wherein the data services are associated with respective ones of a plurality of distributed state machines each comprising a plurality of host device states and host device state transitions.

7. The apparatus of claim 6 wherein the host device state transitions of a given one of the distributed state machines are controlled in accordance with a plurality of state transition rules of that distributed state machine.

8. The apparatus of claim 7 wherein the host device state transition information is read by a state control element of a given one of the host devices in order for that host device to determine if a transition to another state is permissible under the state transition rules of the given distributed state machine.

9. The apparatus of claim 7 wherein the state transition rules of the given distributed state machine comprise one or more of:
a rule specifying that a given host device can advance from a particular state to a next state only if all other host devices have reached the particular state;
a rule specifying that a given host device can advance from a previous state to a particular state and then from the particular state to a next state only if all other host devices have reached the particular state;
a rule specifying that if all host devices cannot advance from a particular state to a next state within a designated period of time then all host devices must return to the particular state; and
at least one additional rule specifying one or more actions taken responsive to detection of at least one of an absent liveliness indication and a data rendering fault for at least one of the host devices.

10. The apparatus of claim 1 wherein a given one of the objects comprises at least a portion of at least one object storage logical unit of the storage system.

11. The apparatus of claim 1 wherein the first and additional sets of storage elements comprise respective portions of at least one host device state transition logical unit of the storage system that is separate from object storage logical units of the storage system.

12. The apparatus of claim 11 wherein the host device state transition logical unit comprises a scratchpad logical unit.

13. The apparatus of claim 1 wherein writes by the host devices to the first and additional sets of storage elements configured to store the host device state transition information are performed using atomic compare and write commands.

14. The apparatus of claim 13 wherein the atomic compare and write commands comprise a Small Computer System Interface (SCSI) compare and write command.

15. The apparatus of claim 1 wherein the storage system further comprises:
a host information table configured to store host identification and liveliness information for respective ones of the host devices; and
a data service information table;
wherein host information of the host information table and data service information of the data service information table are utilized by a data services controller to implement one or more of the data services and to reconstruct host device state transition information responsive to a reboot of at least one of the host devices.

16. A method comprising:
configuring a storage system for accessibility by a plurality of host devices over at least one network;
storing a plurality of objects in the storage system; and storing host device state transition information in the storage system for a plurality of data services each involving one or more of the objects;

wherein storing host device state transition information in the storage system further comprises for a given one of the objects:

storing in a first set of storage elements current state information for each of the host devices for a first data service involving the given object; and storing in one or more additional sets of storage elements current state information for each of the host devices for respective ones of one or more additional data services involving the given object.

17. The method of claim 16 wherein the first and additional sets of storage elements comprise respective portions of at least one host device state transition logical unit of the storage system that is separate from object storage logical units of the storage system.

18. The method of claim 16 wherein writes by the host devices to the first and additional sets of storage elements configured to store the host device state transition information are performed using atomic compare and write commands.

19. A computer program product comprising a non-transitory processor-readable storage medium having stored therein program code of one or more software programs, wherein the program code when executed by a processing platform causes said processing platform:

to configure a storage system for accessibility by a plurality of host devices over at least one network;

to store a plurality of objects in the storage system; and to store host device state transition information in the storage system for a plurality of data services each involving one or more of the objects;

wherein storing host device state transition information in the storage system further comprises for a given one of the objects:

storing in a first set of storage elements current state information for each of the host devices for a first data service involving the given object; and storing in one or more additional sets of storage elements current state information for each of the host devices for respective ones of one or more additional data services involving the given object.

20. The computer program product of claim 19 wherein the first and additional sets of storage elements comprise respective portions of at least one host device state transition logical unit of the storage system that is separate from object storage logical units of the storage system.

21. The computer program product of claim 19 wherein writes by the host devices to the first and additional sets of storage elements configured to store the host device state transition information are performed using atomic compare and write commands.

* * * * *